(12) United States Patent
Schwenk et al.

(10) Patent No.: US 6,636,613 B1
(45) Date of Patent: Oct. 21, 2003

(54) METHOD FOR EMBEDDING MANIPULATION-SECURE DIGITAL FINGERPRINTS INTO ELECTRONIC DOCUMENTS

(75) Inventors: Joerg Schwenk, Dieburg (DE); Johannes Ueberberg, St. Augustin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/415,538

(22) Filed: Oct. 8, 1999

(30) Foreign Application Priority Data

Oct. 9, 1998 (DE) .......................................... 198 47 942

(51) Int. Cl.$^7$ ................................................. G06K 9/00
(52) U.S. Cl. ...................................... 382/100; 713/176
(58) Field of Search ................................. 382/100, 116, 382/124, 126, 232; 380/51, 54, 210, 252, 287; 348/460, 461, 463; 283/72, 74, 75, 81, 85, 93, 113, 901, 902; 713/176, 179, 702

(56) References Cited

U.S. PATENT DOCUMENTS

| 4,972,477 A | 11/1990 | Campbell et al. |
| 5,467,447 A | 11/1995 | Vogel |
| 5,600,738 A | 2/1997 | Bergland et al. |

FOREIGN PATENT DOCUMENTS

| DE | 198 16 356 A 1 | 10/1999 |
| EP | 0 660 275 | 6/1995 |

OTHER PUBLICATIONS

C. Chojetzki, et al. Spectral Determination of Modal Birefringence and Polarization Dispersion of Polarization–Maintaining Fibers with a high Accuracy, Journal of Optical Communications, 13 (1992), pp. 140–145.

*Dan Boneh and James Shaw, Collusion–Secure Fingerprinting for Digital Data, Proc. CRYPTO "95" LNCS, Springer Verlag, Berlin 1995, pp. 452–465.

U.S. patent application Ser. No. 09/285,828, Schwenk et al., filed Apr. 2, 1999.

*Primary Examiner*—Bhavesh M. Mehta
*Assistant Examiner*—Abolfazl Tabatabai
(74) *Attorney, Agent, or Firm*—Kenyon & Kenyon

(57) ABSTRACT

In a method for embedding collusion-secure digital fingerprints in electronic documents, using a geometric order system one point in the projective space PG (d, q) is unambiguously assigned to each flagging position in a document via a secret function. At least two hyperplanes of PG (d, q) are assigned to each fingerprint, each being exclusively assigned to one fingerprint only, and for each fingerprint precisely those flagging positions that correspond to the points of the selected hyperplane are flagged. To trace attempts to delete fingerprints, an intersection of hyperplanes is reconstructed from the flagged flagging positions that have been found in the document, by analyzing linear dependencies the hyperplanes are determined, and by calculating these hyperplanes the fingerprints of colluding customers may be determined.

4 Claims, 3 Drawing Sheets

METHOD FOR EMBEDDING MANIPULATION-SECURE DIGITAL FINGERPRINTS INTO ELECTRONIC DOCUMENTS

FIELD OF THE INVENTION

The present invention relates to providing a digital fingerprint for an electronic document.

BACKGROUND

Due to the rapid growth of the Internet and the resulting possibility of digital dissemination of documents, there is growing demand for ways to prevent illegal dissemination of documents and to protect copyright holders against the problems associated with pirated copies.

To this end, big companies such as IBM, NEC and Microsoft, along with smaller firms such as Digimarc (see Funkschau 17/97, p. 21) and research institutes such as the Fraunhofergesellschaft IGD and GMD Darmstadt, are working on ways to embed digital watermarks in documents. In methods of this kind, data which indicate the identity of the copyright holder are invisibly embedded in the documents to be protected. The type of digital watermark embedded varies according to the type of document (e.g., Postscript, JPEG, MPEG-1).

With digital watermarks, the copyright holder can produce evidence that a given document is his own intellectual property, by comparing it with an illegally disseminated document. However, with digital watermarks it is impossible to determine the identity of the illegal disseminator or to prove that he has indeed carried out illegal dissemination.

Digital fingerprints go one step further. When a document is secured using digital fingerprinting, the name of the customer who is to receive the electronic copy of the document is invisibly embedded in the document, along with the copyright holder's digital watermark. If this customer disseminates his copy contrary to the interests of the copyright holder, he can be unambiguously identified based on his electronic fingerprint, which will be contained in all of the illegally disseminated copies, and he can therefore be held accountable (Dan Boneh and James Shaw, Collusion-Secure Fingerprinting for Digital Data. Proc. CRYPTO 95, LNCS 963, Springer Verlag, Berlin (1995), pages 452–465.)

Until now, digital fingerprinting for protecting documents has had a serious weakness, in that the bit patterns of documents assigned to given customers differ at precisely the position where the customer's user-specific fingerprint is provided. If the customer gains possession of a second customer's document, or a group of lawbreakers collude, they can, by comparing the two documents bit by bit, find the positions at which the differing digital fingerprints are provided and delete them from the document. Using a method described in German Patent Application No. 19816356.8, which is hereby incorporated by reference herein, one can use overlapping finite geometric structures to partially prevent efforts to acquire a copy of the document from which all user-specific fingerprints have been removed. With reference to FIG. 1, because intersection S of fingerprints A, B and C is identical, cannot be found, and is left intact, detective work is possible. However, if the number of lawbreakers is large, detective work of this kind is difficult, and the results can be ambiguous.

SUMMARY OF THE INVENTION

An object of the present invention is to eliminate this shortcoming, so that a larger number of copies of documents is feasible, and so that one can trace even larger groups of lawbreakers more effectively.

The present invention provides a method for embedding manipulation-secure digital fingerprints in electronic documents, wherein a copy of a document in which an individual fingerprint unrecognizable to the buyer has been embedded as an identifier is assigned to each buyer, assignment of the flagging positions of the individual digital fingerprint, which is different for each copy, being based on finite geometric structures as described in German Patent Application No. 19816356.8. Each buyer's copy is flagged at positions defined by the geometric substructure assigned to that buyer and by a secret function, and the points thus established as the buyer's digital fingerprint are defined within the geometric structure so that they intersect with the points of the fingerprints of other buyers, it being possible, by comparing the original document bit by bit with a copy from which fingerprint components have been removed via collusion among a maximum of d buyers, to use the remaining intersections of fingerprints to trace the copies involved in the collusion and hence trace the buyers who have become lawbreakers. The present invention is characterized in that one point in the projective space PG (d, q) of hyperplanes is unambiguously assigned to each flagging position in the document via a secret function, at least two hyperplanes of PG (d, q) are assigned to each fingerprint, each being exclusively assigned to one fingerprint only, and for each fingerprint, precisely those flagging positions that correspond to the points of the selected hyperplane are flagged.

According to an embodiment of the present invention, in order to trace attempts to delete fingerprints the geometric objects are reconstructed from the flagged flagging positions that have been found in the document, by analyzing the linear dependencies one determines in which hyperplanes the objects are contained, and by calculating these hyperplanes one gradually determines the fingerprints of the colluding customers.

BRIEF DESCRIPTION OF THE DRAWINGS

The method according to the present invention is described in greater detail below with reference to the drawings, in which.

DETAILED DESCRIPTION

The present invention is based on use of hyperplanes in finite projective spaces PG (d, q). Herein, parameter d indicates the maximum number of lawbreakers that the system can process. Both of the following requirements are met:

1) each copy of the document is assigned to one customer; and 2) if k customers, where k<d+1, collude and remove from a document all fingerprint components that they can determine via bit by bit comparison, these k customers can be unambiguously identified from the document that has been tampered with.

Figure 1:
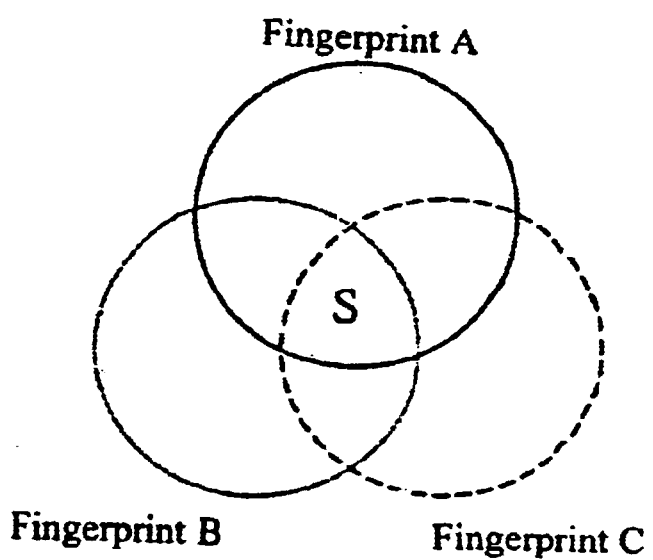
FIG. 1 shows a schematic diagram representing an intersection of three fingerprints.
Figure 2:
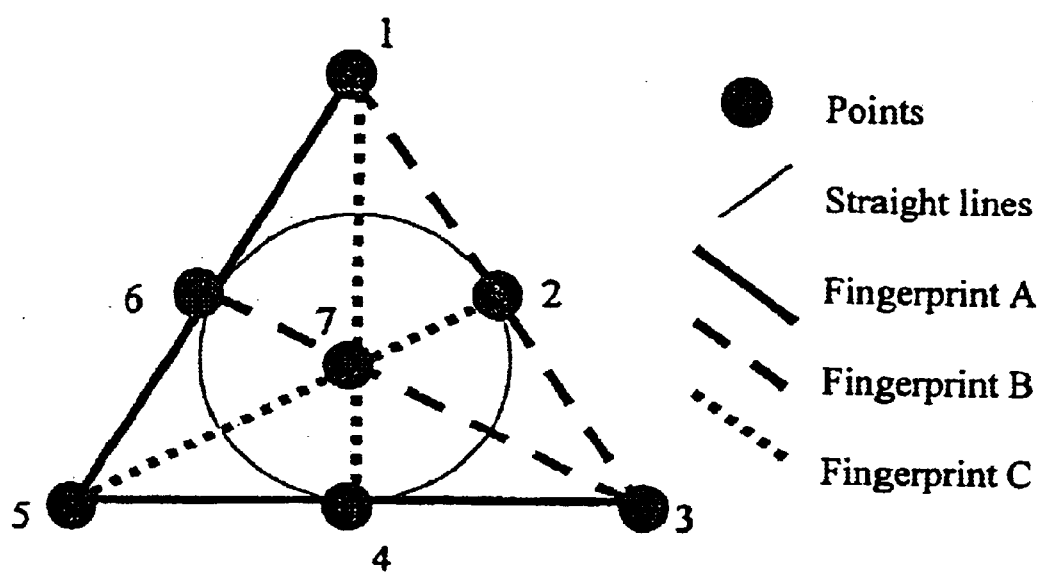
FIG. 2 shows a schematic diagram of an arrangement of three digital fingerprints in projective plane PG (2, 2)

By way of example, the invention may be described in projective plane PG (2, 2). FIG. 2 shows this plane and the various fingerprints A, B and C.

All points and straight lines of projective plane PG (2, 2) are shown in FIG. 2. Using a secret function (or one-way function), a given position in the document is assigned to each point of the projective plane. Customer a receives a document in which the positions belonging to his assigned fingerprint A have been flagged (e.g., by inverting the bits at those positions). In the case of customer a, these would be, for example, the positions assigned to points 1, 5 and 6.

If two customers now compare their fingerprints, they are able to find all the flagged positions except the position that lies at the intersection of the two fingerprints. For example, if customer a with fingerprint A and customer b with fingerprint B compare their fingerprints, they will be able to find the positions corresponding to points 2, 4 and 5, but not positions 1, 3 and 6.

One can determine the identity of the customers if a maximum of two customers are colluding, because each set of intersection points can be overlooked by one pair of customers only. Thus in our example, points 1, 3 and 6 can be overlooked by customers a and b only; customers b and c would have overlooked precisely points 1, 2 and 7 etc.

Figure 3:
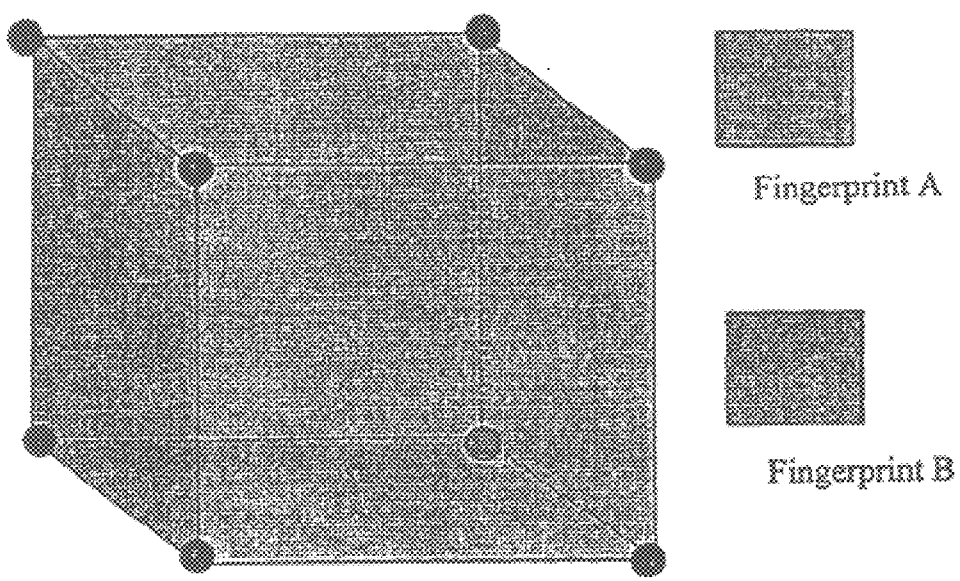
FIG. 3 shows a schematic diagram illustrating the principle of the method according to the present invention in three-dimensional space.

The system described above can be generalized for the use of higher dimensions d and greater orders q. If there are three dimensions, the situation may be illustrated with the help of a cube. Referring to FIG. 3, a given fingerprint, A or B, for example, includes the points that lie on two opposite sides of the cube. Any two fingerprints intersect along exactly four lines, and any three fingerprints intersect at exactly eight points. Therefore one can trace the two (or three) customers who have tried to remove the fingerprints precisely from the intersection of two (or three) fingerprints.

In the generalized case, the invention uses hyperplanes in projective space PG (d, q). At least two hyperplanes, or if necessary more than two, are assigned to each customer. A given hyperplane may be assigned to a customer only once. There are two options for assignment:

1) the two hyperplanes are chosen at random; with this option, the probability that the suspects group will be larger than the group of actual perpetrators is very slight; and 2) the two hyperplanes are "parallel", i.e., they intersect at a selected hyperplane H.

With option 2, the following problem may be avoided: the intersection points of fingerprints A and B in a document have been found, but it is possible that these intersection points were created by the intersection of fingerprints A and C or by fingerprints B and C.

For high dimensions (higher than d=3) one can ignore this problem: There is only an insignificantly low probability that the intersection of d fingerprints will be ambiguous, and in the rare instances when it is, the decoding algorithm will detect this ambiguity. Therefore there is no danger of innocent parties becoming suspects.

To carry out decoding, i.e., to reconstruct the hyperplanes from intersection points (or intersection lines or intersection planes) that have been found, linearly dependent sets are sought. For example, if only $2^d$ intersection points of the d hyperplanes are present in PG (d, q), subsets of $2^{d-1}$ points respectively that lie in a common hyperplane are sought. Once a hyperplane of this type has been found, one fingerprint has been successfully identified.

What is claimed is:

1. A method for inserting manipulation-secure digital fingerprints for an electronic document, a first copy of the document being assigned to a first buyer and a second copy of the document being assigned to a second buyer, the method comprising:

inserting a first fingerprint into the first copy at a first set of marking locations, the first fingerprint being unrecognizable by the first buyer; and inserting a second fingerprint into the second copy at a second set of marking locations, the second fingerprint being unrecognizable by the second buyer;

the first and second set of marking locations being different, each marking location of the first and second set of marking locations being uniquely assigned to a respective corresponding point in a projective space PG (d, q) of hyperplanes using a secret function;

at least two first hyperplanes of the projective space PG (d, q) being exclusively assigned to the first fingerprint, marking locations of the first set of marking locations corresponding to the at least two hyperplanes being flagged at first flagged positions;

at least two second hyperplanes of the projective space PG (d, q) being exclusively assigned to the second fingerprint, marking locations of the second set of marking locations corresponding to the at least two hyperplanes being flagged at second flagged positions;

the at least two first hyperplanes at least partially intersecting with the at least two second hyperplanes.

2. The method as recited in claim 1 further comprising performing a bit-by-bit comparison of an original of the document with the first copy to determine if parts of the first fingerprint have been removed by manipulation.

3. The method as recited in claim 2 wherein, when it is determined that parts of the first fingerprint have been removed by manipulation, further comprising identifying the first purchaser as a function of non-removed parts of the first fingerprint.

4. The method as recited in claim 1 further comprising:

performing a bit-by-bit comparison of an original of the document with the first copy to locate at least some of the first flagged positions;

reconstructing the at least partial intersection of the at least two first hyperplanes with the at least two second hyperplanes from the located at least some first flagged positions;

analyzing linear dependencies to determine the at least two first hyperplanes; and calculating the determined at least two first hyperplanes so as to determine the first fingerprint.

* * * * *